US012095183B2

(12) United States Patent
Goto

(10) Patent No.: US 12,095,183 B2
(45) Date of Patent: Sep. 17, 2024

(54) PRESS-FIT TERMINAL AND METHOD FOR PRODUCING PRESS-FIT TERMINAL

(71) Applicant: Sumitomo Wiring Systems, Ltd., Yokkaichi (JP)

(72) Inventor: Hideki Goto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 841 days.

(21) Appl. No.: 17/272,732

(22) PCT Filed: Sep. 3, 2019

(86) PCT No.: PCT/JP2019/034504
§ 371 (c)(1),
(2) Date: Nov. 3, 2021

(87) PCT Pub. No.: WO2020/054491
PCT Pub. Date: Mar. 19, 2020

(65) Prior Publication Data

US 2022/0077608 A1 Mar. 10, 2022

(30) Foreign Application Priority Data

Sep. 13, 2018 (JP) ................................ 2018-171842

(51) Int. Cl.
*H01R 12/58* (2011.01)
*H01R 43/16* (2006.01)

(52) U.S. Cl.
CPC ............ *H01R 12/58* (2013.01); *H01R 43/16* (2013.01); *H01R 12/585* (2013.01)

(58) Field of Classification Search
CPC ....... H01R 12/58; H01R 43/16; H01R 12/585
See application file for complete search history.

(56) References Cited

U.S. PATENT DOCUMENTS 4,655,537 A * 4/1987 Andrews, Jr. ........ H01R 12/585 439/82
4,763,408 A 8/1988 Heisey et al.
(Continued)

FOREIGN PATENT DOCUMENTS

CN 1040710 A * 3/1990 ........... H01R 12/585

OTHER PUBLICATIONS

Pickles, Mar. 21, 1990, entire document (Year: 1991).*
International Search Report, Application No. PCT/JP2019/034504, mailed Nov. 12, 2019. ISA/Japan Patent Office.

*Primary Examiner* — Briggitte R. Hammond
(74) *Attorney, Agent, or Firm* — Honigman LLP

(57) ABSTRACT

A press-fit terminal has a press-fit portion that includes a first piece and a second piece that are formed as a result of the metal plate being split into two parts in a width direction of the metal plate by a long slit extending in a lengthwise direction of the metal plate. The first piece is curved to protrude in one direction of the thickness direction of the metal plate, and the second piece is curved to protrude in the other direction of the thickness direction of the metal plate. Each of the first piece and the second piece includes a large thickness portion that is provided at a protruding end portion and two small thickness portions that are provided on both sides in the lengthwise direction with the large thickness portion interposed between the two small thickness portions.

7 Claims, 8 Drawing Sheets

(56) References Cited

U.S. PATENT DOCUMENTS

| | | | | |
|---|---|---|---|---|
| 4,857,018 | A * | 8/1989 | Pickles | H01R 12/585 439/82 |
| 7,074,094 | B2 | 7/2006 | Kawahara et al. | |
| 2006/0246786 | A1 | 11/2006 | Noguchi | |
| 2017/0346202 | A1 | 11/2017 | Goto | |

* cited by examiner

PRESS-FIT TERMINAL AND METHOD FOR PRODUCING PRESS-FIT TERMINAL

CROSS-REFERENCE TO RELATED APPLICATIONS

This application is the U.S. national stage of PCT/JP2019/034504 filed on Sep. 3, 2019, which claims priority of Japanese Patent Application No. JP 2018-171842 filed on Sep. 13, 2018, the contents of which are incorporated herein.

TECHNICAL FIELD

The present disclosure relates to a press-fit terminal that is press-fitted into a through-hole formed in a circuit board, and a method for producing the press-fit terminal.

BACKGROUND

In order to electrically connect an electronic component mounted on a circuit board and an electronic component that is external to the circuit board, a press-fit connection, in which a terminal (press-fit terminal) is press-fitted into a through-hole formed in the circuit board, a terminal having a diameter slightly larger than the diameter of the through-hole, may be used. The press-fit terminal is required to be tightly held in the through-hole while having a simple configuration.

JP 2006-54116A proposes a compliant pin including a press-fit portion that is press-fitted into a through-hole formed in a circuit board, wherein a recess portion for catching metal shavings produced as a result of the compliant pin coming into contact with the through-hole is formed in the press-fit portion. The compliant pin disclosed in JP 2006-54116A is made elastic by being configured such that a metal plate is partially split into two portions by pressing the metal plate at two locations on one side and on the other side in the thickness direction, and the two portions are bent to protrude in opposite directions.

However, with the configuration of the compliant pin disclosed in JP 2006-54116A, the two protruding portions formed by being split apart have high mechanical strength, which may inhibit the press-fit portion from being press-fitted into the through-hole of the circuit board.

The present disclosure has been made in view of the circumstances described above, and it is an object of the present disclosure to provide a press-fit terminal that can be expected to be more smoothly press-fitted into a through-hole formed in a circuit board, and a method for producing the press-fit terminal.

SUMMARY

A press-fit terminal according to an aspect of the present disclosure is a press-fit terminal in which a press-fit portion that is press-fitted into a through-hole formed in a circuit board is formed at one end of a long plate-shaped conductor in a lengthwise direction of the conductor, wherein the press-fit portion includes a first piece and a second piece that are formed as a result of the press-fit portion being split into two parts by a slit extending in the lengthwise direction, the first piece is curved to protrude in one direction of a thickness direction of the conductor, the second piece is curved to protrude in the other direction of the thickness direction of the conductor, and each of the first piece and the second piece includes: a large thickness portion that is provided at a protruding end portion and has a large thickness; and two small thickness portions that are provided on both sides of the large thickness portion in the lengthwise direction with the large thickness portion interposed between the two small thickness portions and have a thickness smaller than that of the large thickness portion.

Aspects of an embodiment of the present disclosure will be listed and described first. Also, at least some of the aspects of the embodiment given below may be combined in any way.

A press-fit terminal according to an aspect of the present disclosure is a press-fit terminal in which a press-fit portion that is press-fitted into a through-hole formed in a circuit board is formed at one end of a long plate-shaped conductor in a lengthwise direction of the conductor, wherein the press-fit portion includes a first piece and a second piece that are formed as a result of the press-fit portion being split into two parts by a slit extending in the lengthwise direction, the first piece is curved to protrude in one direction of a thickness direction of the conductor, the second piece is curved to protrude in the other direction of the thickness direction of the conductor, and each of the first piece and the second piece includes: a large thickness portion that is provided at a protruding end portion and has a large thickness; and two small thickness portions that are provided on both sides of the large thickness portion in the lengthwise direction with the large thickness portion interposed between the two small thickness portions and have a thickness smaller than that of the large thickness portion.

According to this aspect, the press-fit terminal is configured such that the press-fit portion is formed at one end of the long plate-shaped conductor, and the press-fit terminal and the circuit board are connected as a result of the press-fit portion being press-fitted into the through-hole formed in the circuit board. The press-fit portion of the press-fit terminal includes a first piece and a second piece that are formed as a result of the conductor being split into two parts in the width direction by a long slit extending in the lengthwise direction of the conductor. The first piece is curved to protrude in one direction of the thickness direction of the conductor, and the second piece is curved to protrude in the other direction. As a result of the first piece and the second piece that are curved and protrude in opposite directions being formed in the press-fit terminal, the first piece and the second piece can be pressed against the inner surface of the through-hole, and thus the press-fit terminal can be fixed to the circuit board.

Also, each of the first piece and the second piece includes a large thickness portion that is provided at a protruding end portion and two small thickness portions that are provided on both sides of the large thickness portion. With the small thickness portions, the mechanical strength of the first piece and the second piece can be reduced, and it is therefore possible to prevent the first piece and the second piece from having excessively high mechanical strength. By setting the thickness of the small thickness portions to an appropriate thickness, the mechanical strength of the first piece and the second piece can be set to an appropriate mechanical strength. Accordingly, the press-fit terminal can be expected to be more smoothly press-fitted into the through-hole.

It is preferable that the large thickness portion of the first piece and the large thickness portion of the second piece partially overlap each other.

According to this aspect, the large thickness portion of the first piece and the large thickness portion of the second piece of the press-fit terminal partially overlap each other. With this configuration, it is possible to, when the press-fit terminal is press-fitted into the through-hole, and the first piece and the second piece deform, guide the deformation direction of the first piece and the second piece to the direction in which the large thickness portions slide against each other. It is possible to, when the first piece and the second piece deform, inhibit disrupting the deformation caused by the first piece and the second piece colliding with each other.

It is preferable that the two small thickness portions are configured such that one of the two small thickness portions that is provided on the one end side in the lengthwise direction is longer in length than the other small thickness portion that is provided on the other end side.

According to this aspect, one large thickness portion and two small thickness portions of each of the first piece and the second piece are arranged in the lengthwise direction of the conductor in the following order: one of the two small thickness portions, the one large thickness portion, and the other small thickness portion. The press-fit terminal is configured such that one of the two small thickness portions that is closer to an end portion of the press-fit terminal that is press-fitted into the through-hole is longer in length than the other small thickness portion that is far from the end portion. With this configuration, the small thickness portion that is closer to the end portion that is press-fitted into the through-hole can have a gentle slope relative to the direction in which the press-fit terminal is press-fitted due to the curved geometry, and thus the press-fit terminal can be more smoothly press-fitted into the through-hole.

It is preferable that the through-hole is circular in shape, and each of the first piece and the second piece is configured such that a protruding end face thereof is formed as a curved surface that conforms to a shape of an inner surface of the through-hole.

According to this aspect, the protruding end faces of the first piece and the second piece are formed as curved surfaces that conform to the shape of the inner surface of the circular through-hole. With this configuration, the press-fit terminal can be more smoothly press-fitted into the through-hole, and the press-fit terminal and the through-hole can be more firmly connected.

It is preferable that the large thickness portion and the small thickness portions are configured such that height differences that correspond to thickness differences are formed on an inner surface of each of the first piece and the second piece that have a curved geometry, and an outer surface is smooth.

According to this aspect, the large thickness portion and the small thickness portions of each of the first piece and the second piece that have a curved geometry are configured such that height differences that correspond to thickness differences are formed on an inner surface of each of the first piece and the second piece that have a curved geometry, and an outer surface is smooth. Accordingly, the outer surfaces of the first piece and the second piece that come into contact with the inner surface of the through-hole can be made into smooth surfaces, and the press-fit terminal can be more smoothly press-fitted into the through-hole.

A method for producing a press-fit terminal according to an aspect of the present disclosure includes a forming step of forming a first piece and a second piece by pressing a long plate-shaped conductor that has a plated surface such that a portion of a predetermined portion of the conductor is pressed in one direction of a thickness direction of the conductor and another portion of the predetermined portion is pressed in the other direction of the thickness direction, so as to split the predetermined portion of the conductor in a width direction of the conductor into two parts to form a slit and curve the conductor to form the first piece that protrudes in the one direction of the thickness direction and the second piece that protrudes in the other direction of the thickness direction, wherein, by pressing and flattening the conductor in the forming step, in each of the first piece and the second piece, two small thickness portions are formed on both sides in a lengthwise direction of the conductor with a large thickness portion at a protruding end portion interposed between the two small thickness portions.

According to this aspect, the press-fit terminal is produced by processing a long plate-shaped conductor with a surface that has already been plated. By using a material that has been plated, the production cost of the press-fit terminal can be reduced.

In the step of forming the first piece and the second piece, a portion of a predetermined portion of the plated conductor is pressed in one direction of the thickness direction, and another portion of the predetermined portion is pressed in the other direction of the thickness direction. In doing so, the conductor is split to form a slit, and the first piece and the second piece that have a curved geometry are formed. Also, in this step, the conductor is pressed so as to press and flatten the portions to be formed as the first piece and the second piece. In doing so, the small thickness portions are formed in each of the first piece and the second piece. By forming the slit, forming the first piece and the second piece, and forming the small thickness portions in a single step, it is only necessary to perform the processing of pressing the conductor once. By reducing the number of times that the machine tool comes into contact with the plated conductor, it is possible to prevent the plating layer or the like from separating from the conductor during processing.

Advantageous Effects of Disclosure

With the configuration described above, the press-fit terminal can be expected to be more smoothly press-fitted into the through-hole formed in the circuit board.

DETAILED DESCRIPTION OF EMBODIMENT OF THE PRESENT DISCLOSURE

A specific example of a press-fit terminal according to an embodiment of the present disclosure will be described below with reference to the drawings. It is to be noted that the present disclosure is not limited to the examples given below, the scope of the present disclosure is indicated by the appended claims, and all changes that come within the meaning and range of equivalency of the claims are intended to be embraced within the scope of the present disclosure.

Terminal Shape

Figure 1:
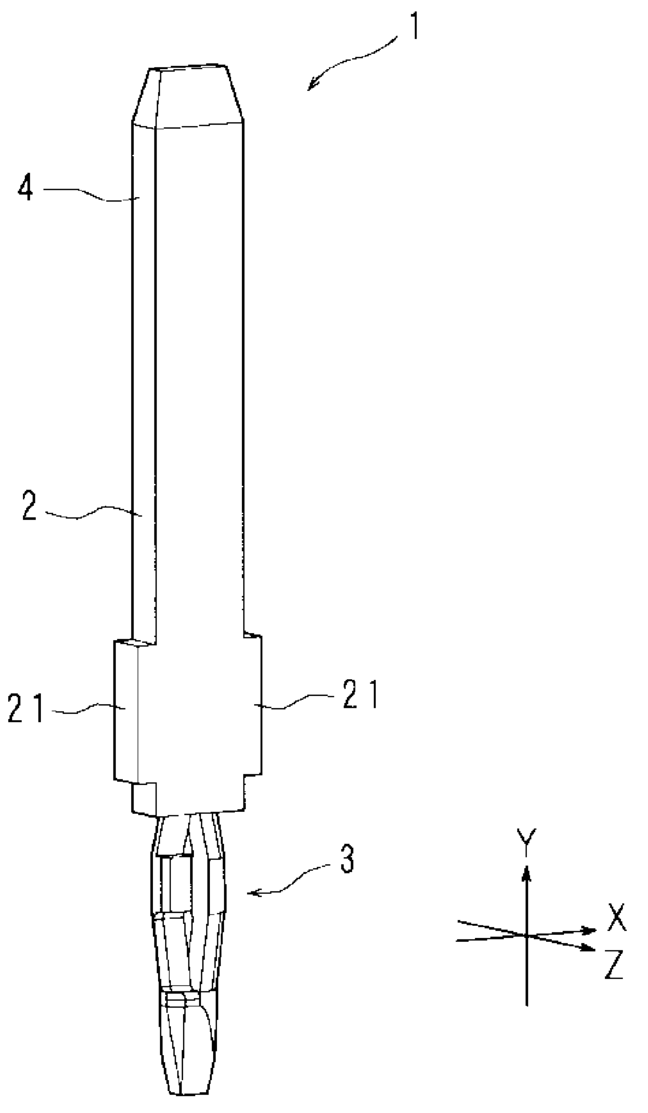
FIG. 1 is a perspective view showing an overall configuration of a press-fit terminal according to an embodiment of the present disclosure.

FIG. 1 is a perspective view showing an overall configuration of a press-fit terminal according to the present embodiment. A press-fit terminal 1 according to the present embodiment is an electric component that is press-fitted into a through-hole (via hole) formed in a circuit board (not shown) and connected to the circuit board, and is used to electrically connect the circuit board to another electronic device. The press-fit terminal 1 according to the present embodiment has a long plate shape, and includes a main body portion 2, a press-fit portion 3 that is provided on one end side of the main body portion 2 in the lengthwise direction, and a connecting portion 4 that is provided on the other side of the main body portion 2. The main body portion 2, the press-fit portion 3, and the connecting portion 4 of the press-fit terminal 1 are all made of metal and have electroconductivity. The press-fit terminal 1 is formed by, for example, press-punching a metal plate obtained in advance by plating the surface of a copper plate or the like with tin or the like. In the description given below, the direction indicated by the arrow X in the diagrams will be referred to as "width direction", the direction indicated by the arrow Y will be referred to as "lengthwise direction", and the direction indicated by the arrow Z will be referred to as "thickness direction".

The main body portion 2 of the press-fit terminal 1 includes locking portions 21 that respectively protrude from two opposing side faces of the main body portion 2 in the width direction. The locking portions 21 are provided at positions closer to the press-fit portion 3 rather than at positions closer to the center portion of the main body portion 2 in the lengthwise direction. The locking portions 21 abut against the surface of the circuit board around the through-hole, and thereby lock the insertion of the press-fit terminal 1 into the through-hole. The press-fit portion 3 of the press-fit terminal 1 is a portion that is press-fitted (inserted with pressure applied thereto) into the through-hole formed in the circuit board. The press-fit portion 3 is provided to extend from an end face of the main body portion 2 on one end side. A detailed configuration of the press-fit portion 3 will be described later. The connecting portion 4 of the press-fit terminal 1 is a portion that connects the press-fit terminal 1 to a connector of another electronic device or the like. In the present embodiment, the connecting portion 4 is provided on the other end side of the main body portion 2 so as to be continuous with the main body portion 2, and the leading end portion of the connecting portion 4 has a tapered truncated pyramidal shape.

Figure 2:
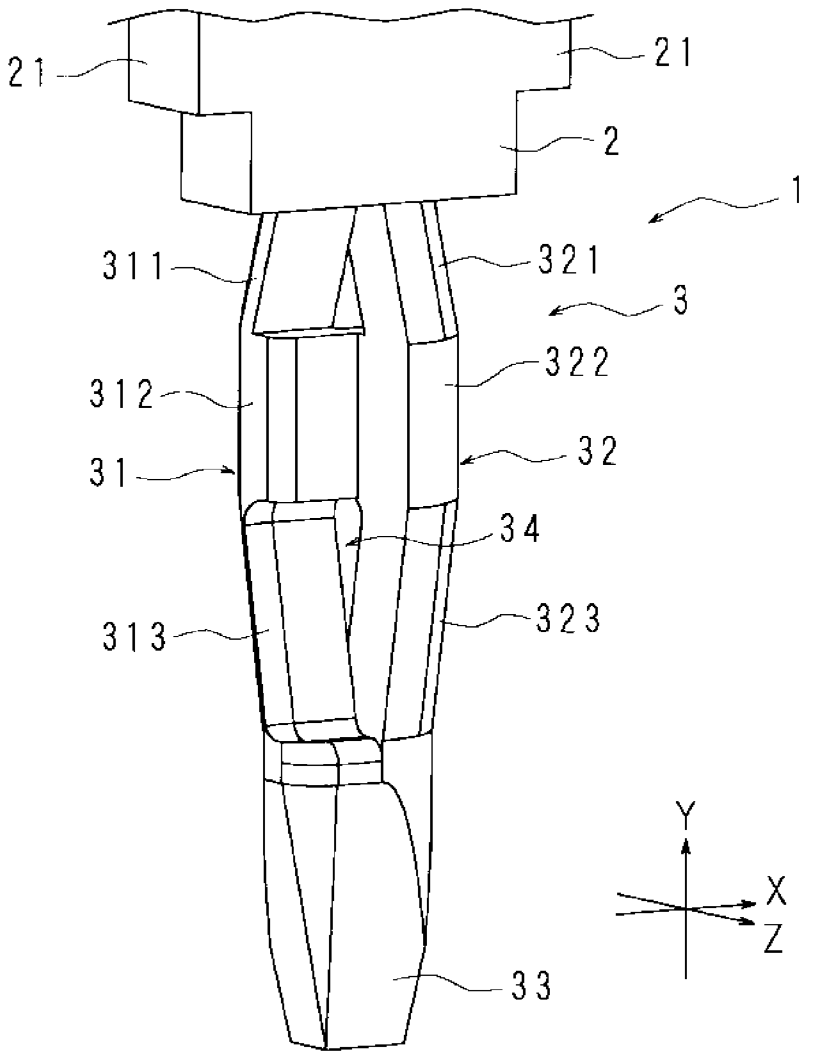
FIG. 2 is an enlarged perspective view showing a configuration of a press-fit portion of the press-fit terminal according to the embodiment of the present disclosure.
Figure 3:
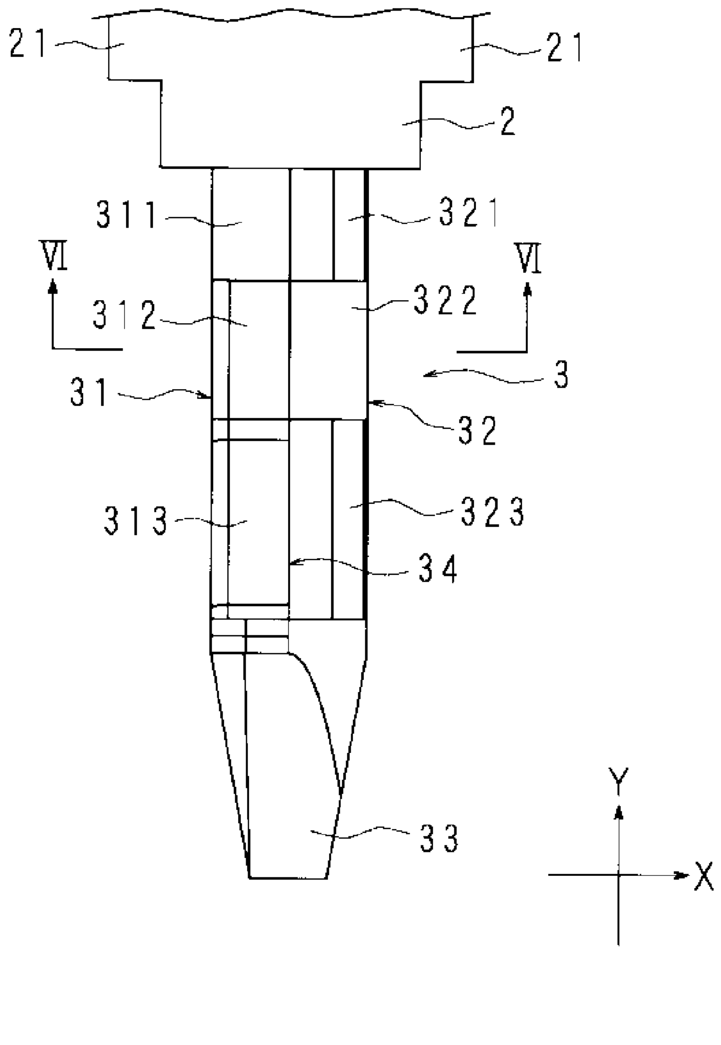
FIG. 3 is a front view showing the configuration of the press-fit terminal according to the embodiment of the present disclosure.
Figure 4:
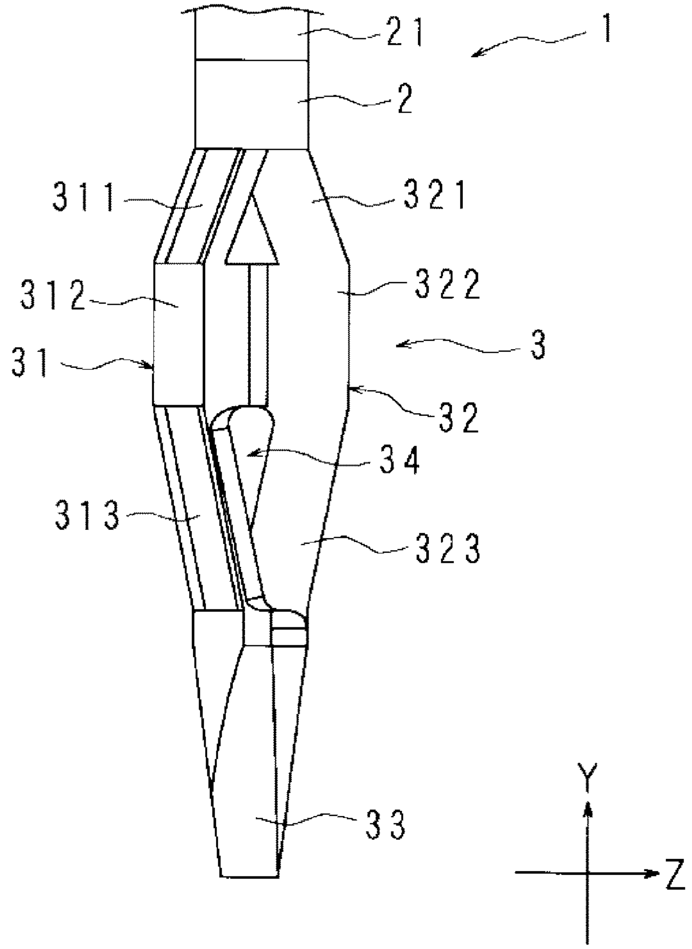
FIG. 4 is a side view showing the configuration of the press-fit terminal according to the embodiment of the present disclosure.
Figure 5:
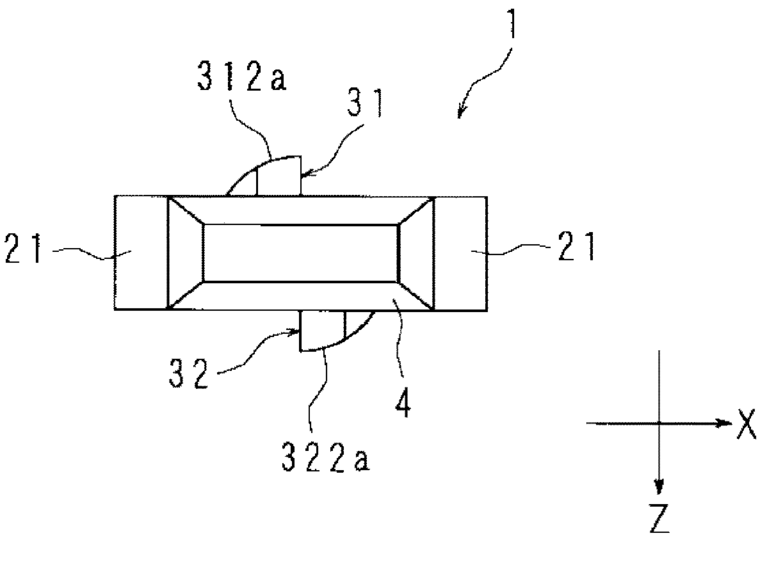
FIG. 5 is a plan view showing the configuration of the press-fit terminal according to the embodiment of the present disclosure, as viewed from a leading end portion side of a connecting portion.

FIG. 2 is an enlarged perspective view showing a configuration of the press-fit portion 3 of the press-fit terminal 1 according to the present embodiment. FIG. 3 is a front view, and FIG. 4 is a side view. FIG. 5 is a plan view showing the configuration of the press-fit terminal 1 according to the present embodiment, as viewed from the leading end portion side of the connecting portion 4. The press-fit portion 3 of the press-fit terminal 1 includes a first elastic piece 31 and a second elastic piece 32 that extend from the end face of the main body portion 2, and a leading end portion 33 to which extension end portions of the two elastic pieces are connected.

The first elastic piece 31 and the second elastic piece 32 are rod-like portions that are curved (or bent) in the form of an arch. The first elastic piece 31 and the second elastic piece 32 are curved in opposite directions. Specifically, the first elastic piece 31 is curved to protrude in one direction of the thickness direction of the press-fit terminal 1, and the second elastic piece 32 is curved to protrude in the other direction (opposite direction) of the thickness direction. A slit 34 that splits the press-fit terminal 1 into two parts is formed between the first elastic piece 31 and the second elastic piece 32 that extend from the end face of the main body portion 2, and the extension ends of the first elastic piece 31 and the second elastic piece 32 are connected at the leading end portion 33. The leading end portion of the leading end portion 33 has a tapered truncated pyramidal shape.

The first elastic piece 31 includes, from the main body portion 2 side, a first thin portion 311, a thick portion 312, and a second thin portion 313 in this order. A protruding end portion of the first elastic piece 31 that protrudes in the thickness direction (or in other words, the top portion of the first elastic piece 31 that is curved in an arc) is the thick portion 312. The first thin portion 311 is a portion that connects the main body portion 2 and the thick portion 312, and the second thin portion 313 is a portion that connects the thick portion 312 and the leading end portion 33. On an inner surface of the first elastic piece 31 in the thickness direction, height differences that correspond to the thicknesses of the first thin portion 311, the thick portion 312, and the second thin portion 313 are formed, and no height difference is formed on an outer surface of the first elastic piece 31.

The thickness of the first thin portion 311 and the second thin portion 313 is about 0.45 times to 0.7 times the thickness of the thick portion 312. For example, in the case where the length of the press-fit portion 3 is about 4.1 mm, and the thickness of the thick portion 312 is 0.63 mm, the thickness of the first thin portion 311 and the second thin portion 313 may be set to a value in the range of about 0.35 mm to 0.6 mm. The thickness of the first thin portion 311 and the second thin portion 313 can be set to an appropriate thickness according to the mechanical strength and the like the press-fit portion 3 is required to have. The length of the first thin portion 311 is about 0.65 mm, the length of the thick portion 312 is about 0.8 mm, and the length of the second thin portion 313 is about 1.15 mm. The first thin portion 311 is shorter than the second thin portion 313. Also, the width of the first elastic piece 31 and the second elastic piece 32 is about 0.45 mm. The numerical values of thickness, length, and width are merely given as an example, and thus the present disclosure is not limited thereto.

The second elastic piece 32 includes, from the main body portion 2 side, a first thin portion 321, a thick portion 322, and a second thin portion 323 in this order. A protruding end portion of the second elastic piece 32 that protrudes in the thickness direction is the thick portion 322. The first thin portion 321 is a portion that connects the main body portion 2 and the thick portion 322, and the second thin portion 323 is a portion that connects the thick portion 322 and the leading end portion 33. On an inner surface of the second elastic piece 32 in the thickness direction, height differences that correspond to the thickness of the first thin portion 321, the thick portion 322, and the second thin portion 323 are formed, and no height difference is formed on an outer surface of the second elastic piece 32. The configuration of the second elastic piece 32 is substantially the same as that of the first elastic piece 31, and thus a description of the numerical values of thickness, length, and width of each portion will be omitted.

The first elastic piece 31 and the second elastic piece 32 are curved to protrude in opposite directions in the thickness direction, respectively, and are spaced apart from each other with the slit 34 therebetween. However, in the press-fit terminal 1 according to the present embodiment, a portion of the thick portion 312 of the first elastic piece 31 and a portion of the thick portion 322 of the second elastic piece 32 overlap each other in the width direction, as a result of which, a center portion of the slit 34 is closed as viewed from a side of the press-fit terminal 1.

Also, as shown in FIG. 5, in the press-fit portion 3 of the press-fit terminal 1, the thick portion 312 of the first elastic piece 31 and the thick portion 322 of the second elastic piece 32 are provided at the outermost positions in the thickness direction. The outer surface of the thick portion 312 of the first elastic piece 31 (the protruding end face of the first elastic piece 31 that protrudes in the thickness direction) is formed as a curved surface 312*a*. Likewise, the outer surface of the thick portion 322 of the second elastic piece 32 is formed as a curved surface 322*a*.

Figure 6:
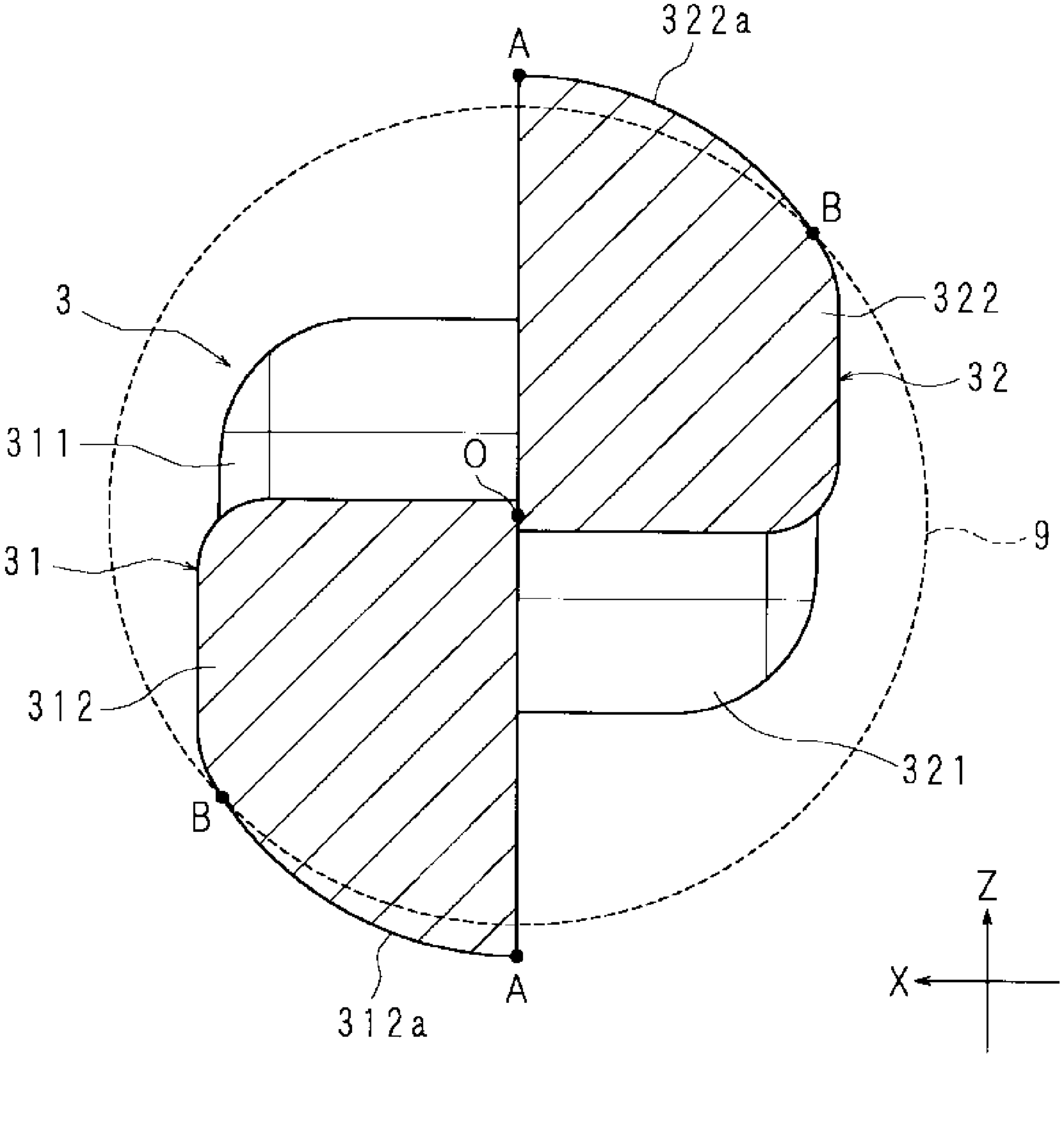
FIG. 6 is a schematic cross-sectional view illustrating a configuration of curved surfaces of the press-fit terminal.
Figure 7:
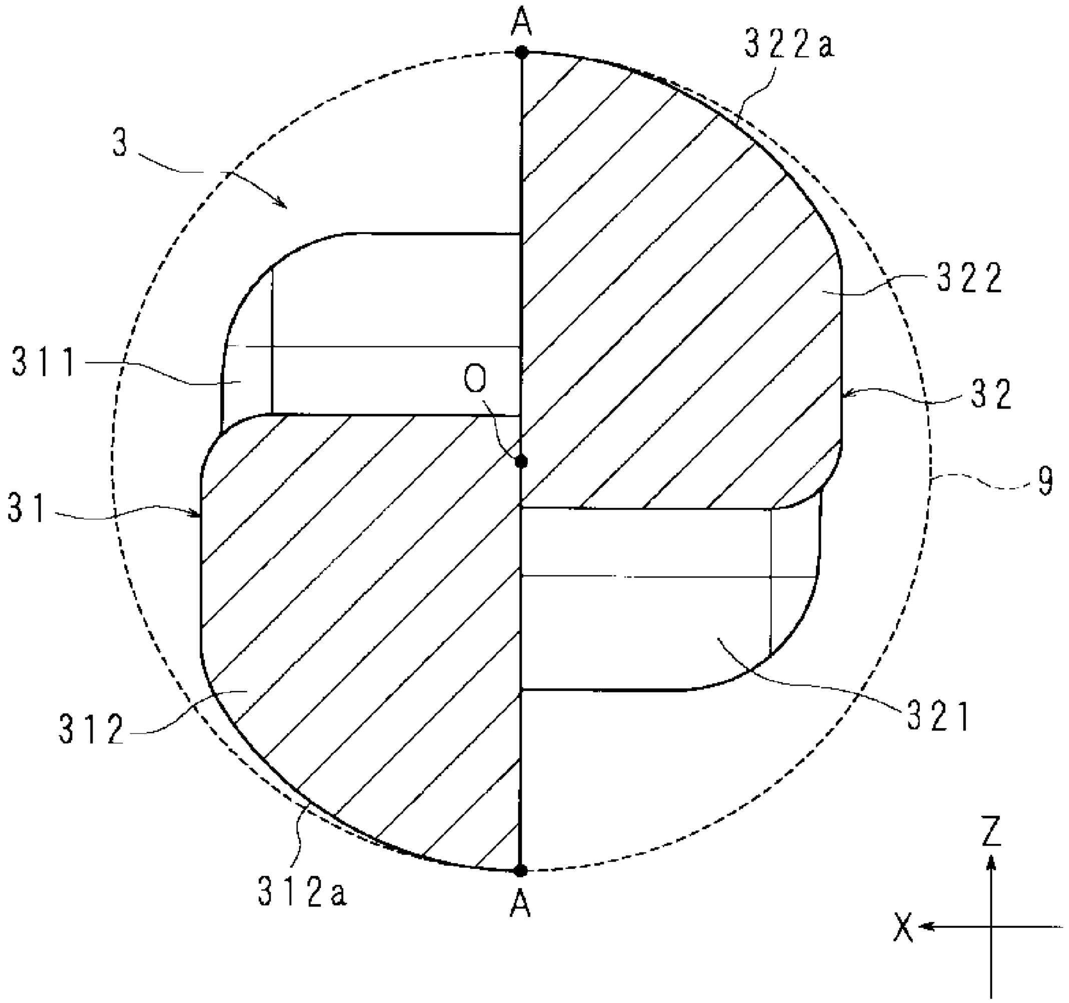
FIG. 7 is a schematic cross-sectional view illustrating the configuration of the curved surfaces of the press-fit terminal.
Figure 8:
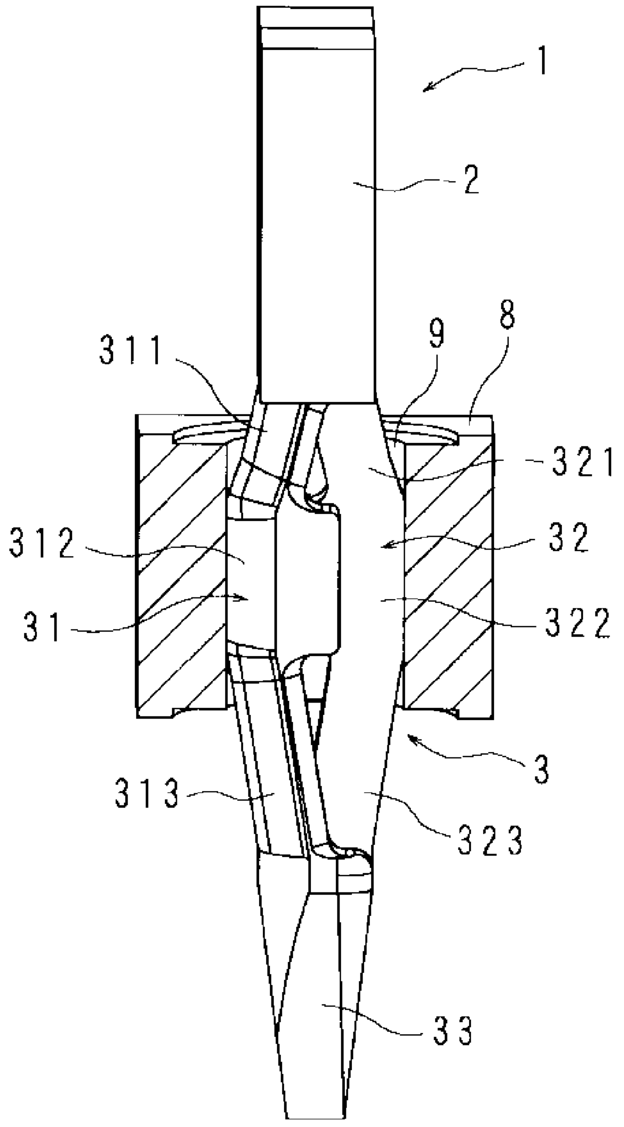
FIG. 8 is a schematic diagram showing the press-fit terminal in a state in which it is press-fitted into a through-hole formed in a circuit board.

FIGS. 6 and 7 are schematic cross-sectional views illustrating a configuration of the curved surfaces 312*a* and 322*a* of the press-fit terminal 1, showing the configuration in a cross section taken along the line VI-VI shown in FIG. 3. The press-fit terminal 1 shown in FIG. 6 is in a state where it is yet to be press-fitted into a through-hole 9. The press-fit terminal 1 shown in FIG. 7 is in a state where it has been press-fitted into the through-hole 9. FIG. 8 is a schematic diagram showing the press-fit terminal in a state in which it is press-fitted in the through-hole 9 formed in the circuit board 8. For comparison, in FIGS. 6 and 7, the through-hole 9 formed in the circuit board into which the press-fit terminal 1 is press-fitted is indicated by a dotted circle. Also, in FIG. 6, the axis of the press-fit terminal 1 (the axis being the center in the width direction and the center in the thickness direction) and the center of the through-hole 9 are indicated by point O.

In the present embodiment, the through-hole 9 formed in the circuit board is substantially circular. As shown in FIG. 6, in the press-fit terminal 1 before being press-fitted into the through-hole, the size of the press-fit portion 3 in the thickness direction is larger than the diameter of the through-hole 9. Accordingly, in the press-fit portion 3 of the press-fit terminal 1 press-fitted into the through-hole 9, the thick portions 312 and 322 provided at the outermost positions abut against the inner surface of the through-hole 9, and the first elastic piece 31 and the second elastic piece 32 are pressed toward the axis O in the thickness direction. At this time, the curved surfaces 312*a* and 322*a* of the thick portions 312 and 322 of the press-fit terminal 1 abut against the inner surface of the through-hole 9. Accordingly, the curved surfaces 312*a* and 322*a* are each formed as an arc curved surface that conforms to the inner surface of the circular through-hole 9.

However, in the press-fit terminal 1 according to the present embodiment, the shape of the curved surfaces 312*a* and 322*a* is not completely congruent with the shape of the inner surface of the through-hole 9, and they are slightly different. As shown in FIG. 6, where the outermost positions of the curved surfaces 312*a* and 322*a* of the press-fit terminal 1 in the thickness direction (the positions at which the axis O intersects in the width direction) are defined as points A, the distance from each of the points A to the axis O is longer than the radius of the through-hole 9. In the curved surfaces 312*a* and 322*a*, the position of the point A is the farthest from the axis O. As the position in the width direction moves farther away from the axis O, the distance from the axis O to each of the curved surfaces 312*a* and 322*a* becomes shorter and matches the radius of the through-hole 9 at a position indicated by point B. As described above, the curved surfaces 312*a* and 322*a* are arc curved surfaces that each have such a cross-sectional shape where as the position in the width direction moves closer to the axis O, it moves further away from the axis O in the thickness direction, and as the position in the width direction moves further away from the axis O, it moves closer to the axis O in the thickness direction.

Accordingly, in the press-fit terminal 1 press-fitted in the through-hole 9, as shown in FIG. 7, the greatest pressing force is applied to the first elastic piece 31 and the second elastic piece 32 at the points A. The pressing force is applied in a direction from each of the points A toward the axis O, and thus the first elastic piece 31 and the second elastic piece 32 deform in this direction. FIG. 7 shows a state in which the press-fit terminal 1 is in contact with the through-hole 9 only at the points A. However, due to the restoring force of the first elastic piece 31 and the second elastic piece 32, the inner surface of the through-hole 9 actually comes into contact with the first elastic piece 31 and the second elastic piece 32 over a wide range of the curved surfaces 312*a* and 322*a*.

Also, as shown in FIGS. 6 and 7, in the press-fit terminal 1, the thick portion 312 of the first elastic piece 31 and the thick portion 322 of the second elastic piece 32 are in contact with each other in the vicinity of the axis O. If there is no contact portion between the first elastic piece 31 and the second elastic piece 32, when the press-fit terminal 1 is press-fitted into the through-hole 9, the first elastic piece 31 and the second elastic piece 32 may deform and collide with each other, and disrupt the deformation of the first elastic piece 31 and the second elastic piece 32. In the press-fit terminal 1 according to the present embodiment, there is a contact portion between the first elastic piece 31 and the second elastic piece 32, when the press-fit terminal 1 is press-fitted into the through-hole 9, the first elastic piece 31 and the second elastic piece 32 move in a direction along the contact surface, and thus deformation of the first elastic piece 31 and the second elastic piece 32 is not inhibited.

Production Method

Figure 9:
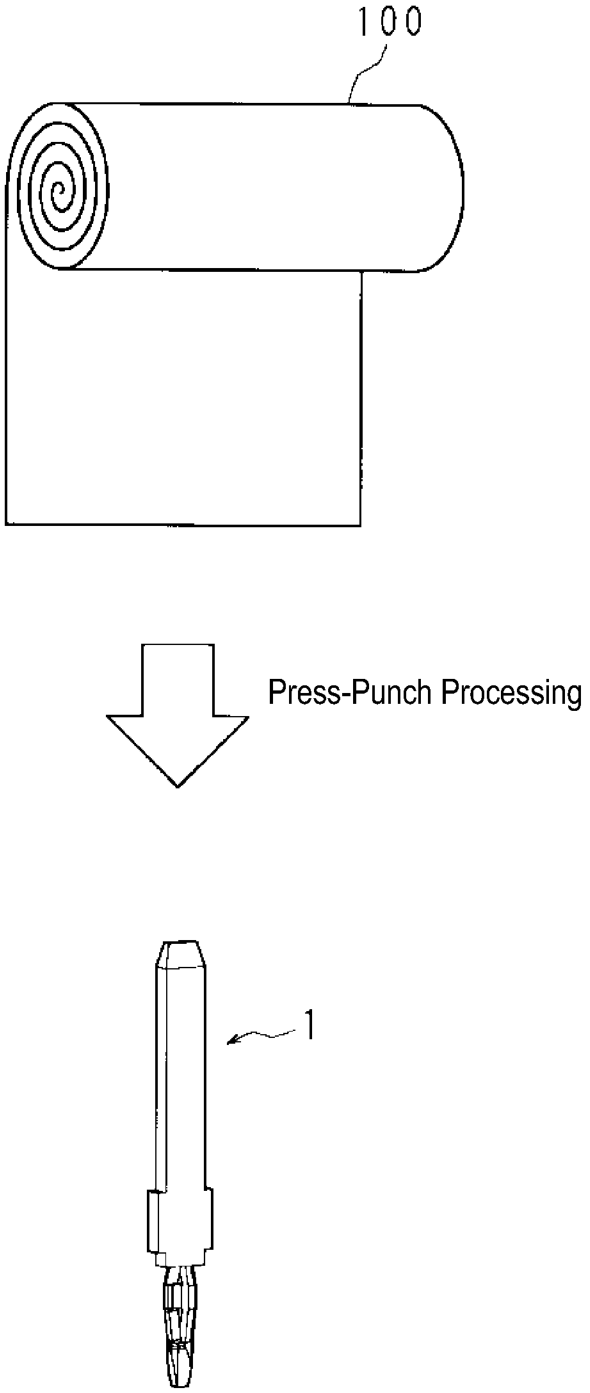
FIG. 9 is a schematic diagram illustrating a production process of the press-fit terminal.

Next, a method for producing the press-fit terminal 1 according to the present embodiment will be described. FIG. 9 is a schematic diagram illustrating a production process for producing the press-fit terminal 1. The press-fit terminal 1 according to the present embodiment is produced using a pre-plated material 100 with a surface that has already been plated, as the material. The pre-plated material 100 may be, for example, a copper plate in the form of a thin plate or a sheet that has a surface to which tin has been applied using an electroplating method. The pre-plated material 100 shown in the diagram is a plated copper plate wound into a coil, but the pre-plated material 100 does not need to be wound.

The production process for producing the press-fit terminal 1 according to the present embodiment includes a first step of preparing a pre-plated material 100 that has been plated in advance. In the first step, the pre-plated material 100 is set to a machine tool for press-punch processing as the material.

In a second step that is performed after the first step, the pre-plated material 100 that has been plated with tin is press-punched. Through the press-punch processing in the second step, one or more press-fit terminals 1 are produced by being punched out from the pre-plated material 100.

In the second step, the first elastic piece 31 and the second elastic piece 32 of the press-fit portion 3 of the press-fit terminal 1 are formed. The machine tool for press-punch processing press-punches a portion to be formed as the press-fit portion 3 of the press-fit terminal 1 so as to press a portion to be formed as the first elastic piece 31 in one direction of the thickness direction of the pre-plated material 100 and press a portion to be formed as the second elastic piece 32 in the other direction. At this time, the machine tool applies, to the portions to be formed as the first thin portion 311 and the second thin portion 313 of the first elastic piece 31, a pressing force larger than the pressing force applied to the portion to be formed as the thick portion 322, so as to flatten the pre-plated material 100 and reduce the thickness. By flattening the pre-plated material 100, metal pieces or the like of the flattened pre-plated material 100 may appear as so-called burrs. Such burrs are removed. Likewise, the machine tool applies, to the portions to be formed as the first thin portion 321 and the second thin portion 323 of the second elastic piece 32, a pressing force larger than the pressing force applied to the portion to be formed as the thick portion 322, so as to flatten the pre-plated material 100 and reduce the thickness.

Also, in the second step, the machine tool presses the portion to be formed as the press-fit portion 3 of the press-fit terminal 1 in one direction of the thickness direction and in the other direction, as a result of which, the portion to be formed as the press-fit portion 3 is split at the center portion thereof, and a slit 34 is thereby formed. As a result of the machine tool further pressing the pre-plated material 100, a first elastic piece 31 curved to protrude in one direction and a second elastic piece 32 curved to protrude in the other direction are formed in the portion to be formed as the press-fit portion 3.

SUMMARY

The press-fit terminal 1 according to the present embodiment configured as described above has a configuration in which a press-fit portion 3 is provided on one end side of a main body portion 2 that is a metal plate in the lengthwise direction, and the press-fit terminal 1 is connected to a circuit board 8 as a result of the press-fit portion 3 being press-fitted into a through-hole 9 formed in the circuit board 8. The press-fit portion 3 of the press-fit terminal 1 includes a first elastic piece 31 and a second elastic piece 32 that are formed as a result of the press-fit portion being split into two parts in the width direction by a long slit 34 extending in the lengthwise direction. The first elastic piece 31 is curved to protrude in one direction of the thickness direction, and the second elastic piece 32 is curved to protrude in the other direction (opposite direction) of the thickness direction. As a result of the first elastic piece 31 and the second elastic piece 32 that are curved to protrude in opposite directions being formed in the press-fit terminal 1, the first elastic piece 31 and the second elastic piece 32 can be pressed against the inner surface of the through-hole 9 of the circuit board 8, and thus the press-fit terminal 1 can be fixed to the circuit board 8.

Also, the first elastic piece 31 and the second elastic piece 32 of the press-fit terminal 1 respectively have thick portions 312 and 322 at their protruding end portions, and first thin portions 311 and 321 and second thin portions 313 and 323 that are provided on both sides of the thick portions 312 and 322 in the lengthwise direction. Accordingly, with the thin portions, the mechanical strength of the first elastic piece 31 and the second elastic piece 32 can be reduced, and it is therefore possible to prevent the first elastic piece 31 and the second elastic piece 32 from having excessively high mechanical strength. By setting the thickness of the thin portions to an appropriate thickness, the mechanical strength of the first elastic piece 31 and the second elastic piece 32 can be set to an appropriate mechanical strength.

Also, the thick portion 312 of the first elastic piece 31 and the thick portion 322 of the second elastic piece 32 of the press-fit terminal 1 have an overlapping portion that closes a portion of the slit 34 that divides the press-fit terminal 1 into the first elastic piece 31 and the second elastic piece 32. With this configuration, it is possible to, when the press-fit terminal 1 is press-fitted into the through-hole 9, and the first elastic piece 31 and the second elastic piece 32 deform, guide the deformation direction of the first elastic piece 31 and the second elastic piece 32 to the direction in which the overlapping thick portions 312 and 322 slide against each other. It is possible to, when the first elastic piece 31 and the second elastic piece 32 deform, inhibit disrupting the deformation caused by the first elastic piece 31 and the second elastic piece 32 colliding with each other.

Also, in the press-fit terminal 1, the protruding end faces of the first elastic piece 31 and the second elastic piece 32 are formed as curved surfaces 312*a* and 322*a* that conform to the shape of the inner surface of the circular through-hole 9 formed in the circuit board 8. With this configuration, the press-fit terminal 1 can be more smoothly press-fitted into the through-hole 9, and the press-fit terminal 1 and the through-hole 9 can be more firmly connected.

Also, in the press-fit terminal 1, the first thin portions 311 and 321, the thick portions 312 and 322, and the second thin portions 313 and 323 of the first elastic piece 31 and the second elastic piece 32 that have a curved geometry are configured such that height differences according to the thickness are formed on the inner surfaces of the first elastic piece 31 and the second elastic piece 32, and the outer surfaces are smooth. Accordingly, the outer surfaces of the first elastic piece 31 and the second elastic piece 32 that come into contact with the inner surface of the through-hole 9 can be made into smooth surfaces, and the press-fit terminal 1 can be more smoothly press-fitted into the through-hole 9.

Also, the curved surfaces 312*a* and 322*a* of the press-fit terminal 1 are configured such that a portion that has a shorter distance in the width direction from the axis O has a longer distance in the thickness direction from the axis O, and that a portion that has a longer distance in the width direction from the axis O has a shorter distance in the thickness direction from the axis O. Accordingly, relative to the circular through-hole 9, a portion of the press-fit terminal 1 that is located at the center in the width direction can be shaped to protrude the most toward the inner surface of the through-hole 9. Thus, a large force that deforms the first elastic piece 31 and the second elastic piece 32 in the thickness direction is applied to the press-fit terminal 1 press-fitted into the through-hole 9, which causes the first elastic piece 31 and the second elastic piece 32 to deform in the thickness direction.

Also, to produce a press-fit terminal 1, a pre-plated material 100 that has been plated in advance is prepared as a first step, and thereafter, a second step of forming a first elastic piece 31 and a second elastic piece 32 is performed.

By using the pre-plated material 100 that has been plated in advance, the production cost of the press-fit terminal 1 can be reduced.

Also, in the second step, the pre-plated material 100 that has been plated is pressed such that a portion of a predetermined portion to be formed as the press-fit portion 3 is pressed in one direction of the thickness direction, and another portion of the predetermined portion is pressed in the other direction of the thickness direction. In this way, the pre-plated material 100 is split to form a slit 34 and form a first elastic piece 31 and a second elastic piece 32 that have a curved geometry. Also, in this step, the pre-plated material 100 is pressed so as to press and flatten a portion of the portions that correspond to the first elastic piece 31 and the second elastic piece 32. In doing so, first thin portions 311 and 321 and second thin portions 313 and 323 are formed. By forming the slit 34 in the pre-plated material 100, forming the first elastic piece 31 and the second elastic piece 32, and forming the first thin portions 311 and 321 and the second thin portions 313 and 323 in a single step, it is only necessary to perform the processing of pressing the pre-plated material 100 once. By reducing the number of times that the machine tool comes into contact with the pre-plated material 100 that has been plated, it is possible to prevent the plating layer or the like from separating from the pre-plated material 100 during processing.

In the present embodiment, the metal terminal component that is press-fitted into the through-hole 9 of the circuit board 8 is referred to as a "press-fit terminal", but the present disclosure is not limited thereto, and the terminal component may also be referred to as, for example, a "compliant pin", or the like. Also, the press-fit terminal 1 is formed using a copper metal plate plated with tin, but the present disclosure is not limited thereto. It is also possible to use a metal plate other than a copper metal plate, and plating may be performed using a material other than tin. Also, the press-fit terminal 1 may be produced using a conductor plate other than metal.

Also, in the production process for producing the press-fit terminal 1, plating is performed first, and thereafter, press-punch processing is performed. However, the present disclosure is not limited thereto. Plating may be performed after press-punch processing. Also, plating is performed using an electroplating method, but the present disclosure is not limited thereto, and various types of plating methods other than the electroplating method may be used. Also, the first elastic piece 31 and the second elastic piece 32 of the press-fit terminal 1 are formed through press-punch processing, but the present disclosure is not limited thereto, and the first elastic piece 31 and the second elastic piece 32 may be formed using various types of methods other than the press-punch processing.

The embodiment disclosed herein is intended to be illustrative in all aspects rather than restrictive. The scope of the present disclosure is not limited to the description given above and is indicated by the appended claims, and all changes that come within the meaning and range of equivalency of the claims are intended to be embraced within the scope of the present disclosure.

The invention claimed is:

1. A press-fit terminal in which a press-fit portion that is press-fitted into a through-hole formed in a circuit board is formed at one end of a long plate-shaped conductor in a lengthwise direction of the conductor, wherein the press-fit portion includes a first piece and a second piece that are formed as a result of the press-fit portion being split into two parts by a slit extending in the lengthwise direction, the first piece is curved to protrude in one direction of a thickness direction of the conductor, the second piece is curved to protrude in the other direction of the thickness direction of the conductor, and each of the first piece and the second piece includes: a large thickness portion; and two small thickness portions disposed on opposite sides of the large thickness portion in the lengthwise direction wherein the large thickness portion is interposed between the two small thickness portions and have a thickness smaller than that of the large thickness portion, and wherein the large thickness portion of the first piece and the large thickness portion of the second piece partially overlap each other and one of the two small thickness portions is longer in length than the other small thickness portion.

2. The press-fit terminal according to claim 1, wherein the two small thickness portions are configured such that one of the two small thickness portions that is provided on the one end side in the lengthwise direction is longer in length than the other small thickness portion that is provided on the other end side.

3. The press-fit terminal according to claim 1, wherein the through-hole is circular in shape, and each of the first piece and the second piece is configured such that a protruding end face thereof is formed as a curved surface that conforms to a shape of an inner surface of the through-hole.

4. The press-fit terminal according to claim 1, wherein the large thickness portion and the small thickness portions are configured such that height differences that correspond to thickness differences are formed on an inner surface of each of the first piece and the second piece that have a curved geometry, and an outer surface is smooth.

5. A method for producing a press-fit terminal, the method comprising:

a forming step of forming a first piece and a second piece by pressing a long plate-shaped conductor that has a plated surface such that a portion of a predetermined portion of the conductor is pressed in one direction of a thickness direction of the conductor and another portion of the predetermined portion is pressed in the other direction of the thickness direction, so as to split the predetermined portion of the conductor in a width direction of the conductor into two parts to form a slit and curve the conductor to form the first piece that protrudes in the one direction of the thickness direction and the second piece that protrudes in the other direction of the thickness direction, wherein, by pressing and flattening the conductor in the forming step, in each of the first piece and the second piece, two small thickness portions are formed on both sides in a lengthwise direction of the conductor with a large thickness portion interposed between the two small thickness portions and wherein one of the two small thickness portions is longer in length than the other small thickness portion.

6. The press-fit terminal according to claim 2, wherein the large thickness portion and the small thickness portions are configured such that height differences that correspond to thickness differences are formed on an inner surface of each of the first piece and the second piece that have a curved geometry, and an outer surface is smooth.

7. The press-fit terminal according to claim 3, wherein the large thickness portion and the small thickness portions are configured such that height differences that correspond to thickness differences are formed on an inner surface of each of the first piece and the second piece that have a curved geometry, and an outer surface is smooth.

* * * * *